Sept. 8, 1970     N. E. CLARK ET AL     3,527,507
UNITARY BEARING ELEMENT WITH IMPROVED, INTEGRAL
SCRAPER-SEALING LIP Filed Feb. 12, 1968     2 Sheets-Sheet 1

INVENTORS:
NORMAN E. CLARK
THEODORE ESKILD

BY Robert Henderson

ATTORNEY

Sept. 8, 1970 N. E. CLARK ET AL 3,527,507
UNITARY BEARING ELEMENT WITH IMPROVED, INTEGRAL
SCRAPER-SEALING LIP
Filed Feb. 12, 1968 2 Sheets-Sheet 2

INVENTORS:
NORMAN E. CLARK
THEODORE ESKILD
BY Robert Henderson

ATTORNEY

United States Patent Office 3,527,507
Patented Sept. 8, 1970

3,527,507
UNITARY BEARING ELEMENT WITH IMPROVED, INTEGRAL SCRAPER-SEALING LIP
Norman E. Clark, Macedon, and Theodore Eskild, Palmyra, N.Y., assignors to Garlock Inc., Palmyra, N.Y., a corporation of New York
Filed Feb. 12, 1968, Ser. No. 704,628
Int. Cl. F16c 17/00, 21/00, 29/00
U.S. Cl. 308—3.5                                     1 Claim

ABSTRACT OF THE DISCLOSURE

A unitary, cylindrical bearing element for a reciprocating or rotating rod or piston or the like is formed of relatively stiff plastic material with a clindrical body portion having an integral, annular axially extending, scraper-sealing lip at one end thereof; the lip having a flaring portion distal from said body portion, and being relatively thin and of substantial axial dimension, thereby enabling the flared lip portion to be flexed from flared condition to cylindrical condition easily and without deleterious strain upon the lip and its junction with the remainder of the bearing element.

---

This invention is directed to the provision of a unitary, cylindrical, bearing element for supporting a movable rod, shaft, piston, or like member relatively to a cylinder within which it moves; said element including the provision of one or more integral, annular lips, of improved characteristics, for excluding dirt or other deleterious matter from the bearing and/or for opposing the movement of fluid between the bearing element and such a cylinder.

THE PROBLEM

In prior bearing elements of a generaly similar character, rubber has been employed; but rubber is not hard enough or sufficiently durable to serve satisfactorily for scraping or cleaning lips. Rubber, also, is not hard enough or durable enough for bearing purposes.

Metal also has been used for such bearing elements; but metal suitable for use for bearing purposes has been found to be too brittle or otherwise not suitable for use in sealing and/or scraping lips.

Relatively stiff or hard plastic material also has been used for such bearing elements; but the dimensional characteristics and design of prior sealing and/or scraping lips cause difficulty in installation of the bearing element and give rise to lip breakage.

Such a lip, for sealing purposes should be sensitive to fluid pressures encountered in a related mechanism to urge and hold the lip tightly into sliding engagement with a related rod or cylinder wall. However, most prior plastic lips, because of their dimensional characteristics and design, are not sufficiently sensitive to such fluid pressures to afford adequate urging and holding of the lip in such tight sliding engagement.

Recognizing that rubber and metal are unsuitable for use in solving the problem, the principal object of this invention is the provision of such a bearing element of stiff plastic material in which element the lip for sealing and/or scraping possesses such dimensional characteristics and design as to facilitate installation, to avoid lip breakage and to be adequately sensitive to encountered fluid pressures.

A further object is the provision of such improved lips facing axially and oppositely away from the bearing element, one of the lips, facing in one direction, toward contained fluid pressure, for sealing purposes, and another of the lips facing in the opposite direction for scraping purposes.

THE SOLUTION OF THE PROBLEM BY THE PRESENT INVENTION

This invention solves the problem by provision of a bearing element as hereinbefore set forth in the foregoing "Abstract of the Disclosure," and more, particularly, in providing the mentioned integral lip having a relatively wide generally cylindrical base portion, one end of which adjoins a body portion of the bearing element, and having also an annular flaring, frusto-conical portion, of substantial axial dimension, adjoining the other end of the base portion.

The mentioned flaring or frusto-conical portion is the only part of the bearing element which presents any material interference to the rod or cylinder to which the bearing element is being applied. However, as the said frusto-conical portion is spaced from the body portion to the extent of the width of the cylindrical base portion and as the overall length of the lip is substantial, corresponding approximately to the combined widths of the base and flaring portions, the lip, despite the relative stiffness of its material, is readily distortable so that its flaring portion becomes substantially cylindrical, upon installation of the bearing element, without damage to the lip or to any other part of the bearing element.

THE ACCOMPANYING DRAWING

DETAILED DESCRIPTION OF ILLUSTRATED EMBODIMENTS

Figure 1:
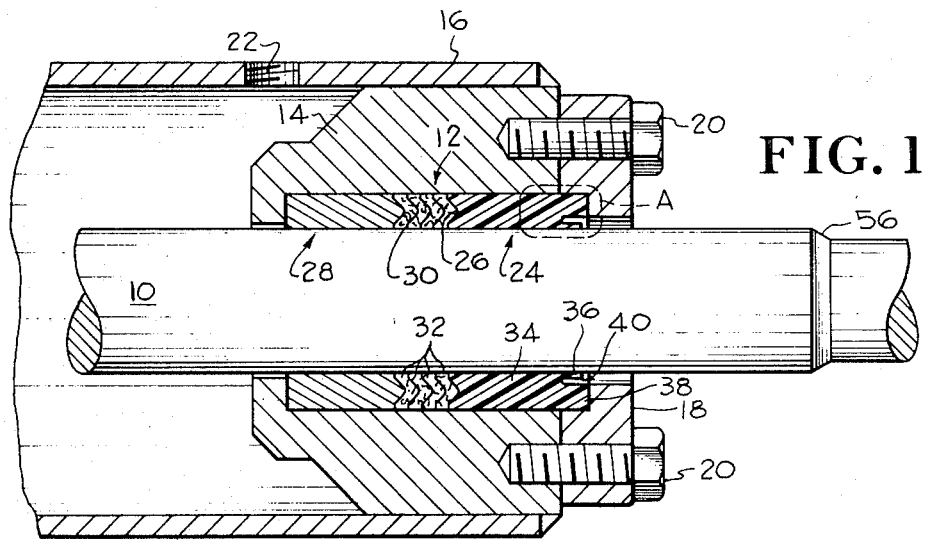
FIG. 1 is a central longitudinal sectional view of a bearing element according to a first embodiment of this invention as applied to a rod or shaft which is movable within a related machine element.

All parts shown in the drawing are annular except as otherwise clearly indicated.

Figure 2:
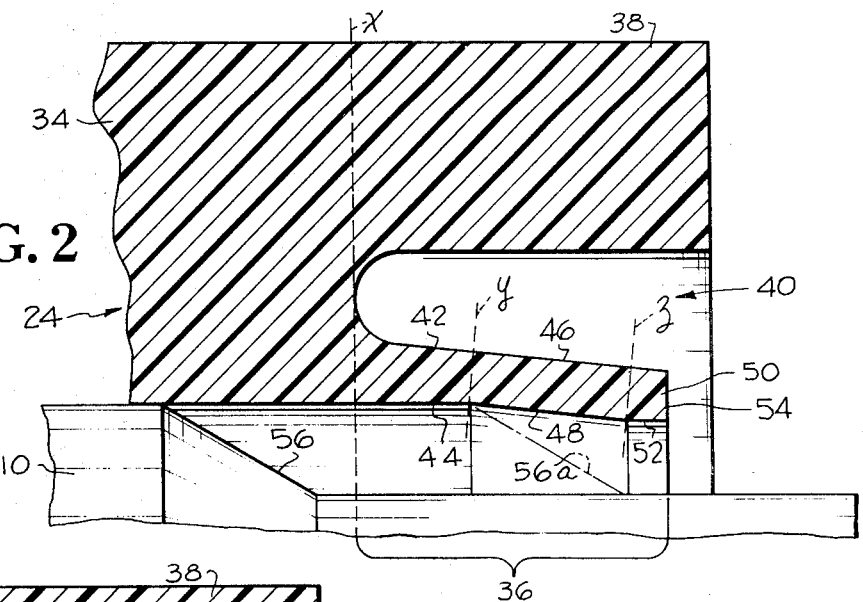
FIG. 2 is a fragmentary enlargement of the outer or right end of said bearing element as circumscribed by broken line A in FIG. 1; a sealing-scraper lip thereof being shown, however, in relaxed condition as before installation of the bearing element upon the rod.
Figure 3:
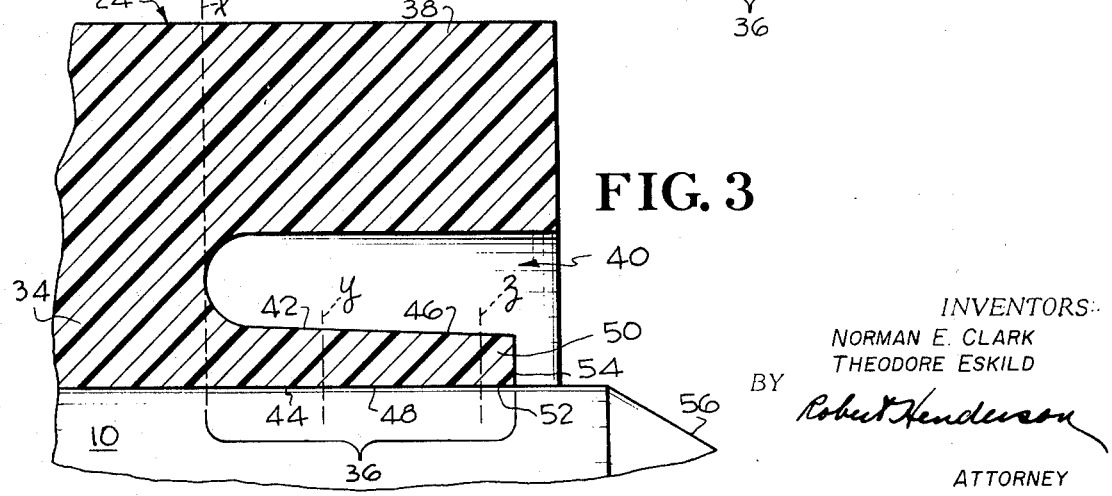
FIG. 3 is a generally similar fragmentary enlargement in which, however, the sealing-scraper lip is shown as distorted to cylindrical condition as when on a rod as shown in FIGS. 1, 4 and 5.

Referring to the first embodiment, illustrated in FIGS. 1–3, a rod 10 is arranged to reciprocate within a bearing assembly 12 carried in a bearing housing 14, welded or otherwise suitably fixed into one end of a cylinder 16; the bearing assembly being firmly clamped into the bearing housing by a cap plate 18, held against the outer end of the bearing assembly by plural screws 20. A suitable piston, not shown, is carried at the inner or left end of the rod 10 for operation within the cylinder 16; and the right end of said rod is suitably connected to some mechanism (also not shown) to be operated by the piston and rod. The cylinder is provided with a port 22, permitting connection of the cylinder to a suitable fluid supply or exhaust means.

The illustrated bearing assembly 12 consists of a first bearing element 24 formed with an axially inwardly facing circular groove 26, an adapter 28, which may be regarded as a second bearing element, formed with an axially outwardly facing circular ridge 30, and a stack of plural packing rings 32 compressed firmly between the groove 26 and the ridge 30 by the clamping action of the plate 18 and the screws 20.

The bearing element 24 is molded (and machined to some extent if necessary) of a suitable non-metallic material such as, for example, a homogeneous plastic material. The plastic material used should be quite hard and stiff, preferably in the range of 95–100 on the Rockwell M scale. The plastic material used may be reinforced with discrete, unoriented fibers (not shown) distributed uniformly throughout the mass of the plastic material. Such fibers may be of glass or other suitable material.

The bearing element 28 may be of material similar to that used for the bearing element 24, or it may be of suitable metal.

The packing rings 32 are of relatively soft material such as rubber impregnated fabric and are V shaped in section. They are internested with channels of the V facing axially inwardly toward relatively high fluid pressure to be contained within the cylinder 16, and are held firmly between the bearing elements 24 and 28 as already explained.

The radially outer surfaces of the bearing elements 24 and 28 and of the packing rings 32 are in tight engagement with the bearing housing 14, the packing rings 32, in particular, being in such sealing engagement with said housing as to prevent or substantially oppose the leakage of fluid from within the cylinder 16, around the outside of the bearing elements 24, 28 and the packing rings 32.

The radially inner surfaces of the bearing elements 24, 28 and the packing rings 32 are in intimate sliding engagement with the rod 10, the packing rings 32, in particular being in sealing engagement with said rod to prevent or substantially oppose leakage of fluid outwardly along the rod.

The present invention resides in the illustrated, novel first bearing element 24 and in combinations and modifications thereof as hereinafter explained. To facilitate delineation of the several parts of such novel bearing elements, broken lines $x$, $y$, and $z$ have been applied to FIGS. 2 and 3 and such delineation also applies to corresponding parts of the several modifications.

The novel bearing element 24 is a single piece comprising a relatively thick annular body portion 34, a relatively thin scraper-sealing lip 36 adjoining a radially inner part of said body portion approximately at broken line $x$, and a relatively thick extension 38 adjoining a radially outer part of said body portion and overlying the lip 36 in spaced relation thereto, the space between said lip and extension being a relatively deep annular groove 40.

The lip 36 is relatively long as compared to its thickness and these two characteristics, particularly the thickness, should be such as to permit slight flexing of the lip, despite the stiffness of its material, as hereinafter explained.

The lip 36 consists of at least two parts, (1) a generally cylindrical base portion 42 having a cylindrical inner surface 44, this base portion adjoining the body portion 34 at broken line $x$, and (2) an annular, inwardly flaring frusto-conical portion 46 adjoining the base portion 42 at broken line $y$. The frusto-conical portion 46 has an inner surface 48 which is frusto-conical in shape in a relaxed condition of the lip 36 as shown in FIG. 2. When the bearing element is installed upon the rod 10 as in FIG. 3, the frusto-conical portion 46 becomes dilated, causing the surface 48 to assume a cylindrical shape.

The lip 36 may, with some advantage, include a third part in the form of a relatively narrow annular extremity portion 50, adjoining the frusto-conical portion 46 at broken line $z$. This extremity portion has an inner surface 52 which is cylindrical in both the relaxed and the dilated conditions of the lip 36, and, also, has an end surface shown as a flat annular surface 54. The end surface 54 need not necessarily be flat, but in any event, it should form such angle with the shaft as to scrape deleterious matter therefrom.

Mounting of the bearing element 24 upon a rod such as rod 10 is facilated by providing a frusto-conical shoulder 56 on the rod or by having an end of the rod chamfered to a shape somewhat similar to said shoulder. Where conditions permit, the bearing element is slid leftwardly onto the rod as viewed in FIGS. 1 and 2. In FIG. 2, the full line representation of shoulder 56 indicates conditions as shortly before said shoulder encounters any interference from any part of the lip 36.

However, as sliding movement of the bearing element onto the rod continues, the shoulder encounters initial interference from said lip at the point indicated by chain line 56a and corresponding also to broken line $y$. As said point of interference is substantially distant from the inner end (at broken line $x$) of the lip's base portion 42, continued leftward sliding of the bearing element first causes slight radially outward flexing of said base portion about its inner end, then, as such sliding continues, the flaring portion 46 dilates progressively to a greater extent and, finally, to its full extent; the base portion 42, meanwhile, progressively relaxing somewhat from its said flexing.

As the described flexing and dilation progresses throughout movement of the shoulder 56 along the entire, relatively substantial width of the flaring portion 46, such flexing and dilation is substantially distributed or drawn out and is so mild and of such slight extent that, despite the relative hardness of the material of the lip 36, the latter suffers no damage or breakage. The just stated condition arises largely from leverage present in the lip 36 between broken lines $x$ and $y$. Additionally, of course, the mounting of the bearing element upon the rod is accomplished without the application of excessive force to said parts.

It it were not for the inclusion of base portion 42 as a part of the flexible lip 36, the flaring portion 46 would have its inner end approximately at the broken line shoulder with said flaring portion would occur at line $x$. In that situation, initial interference of the rod's shoulder 56 with said flaring portion would occur at line $x$, affording no material leverage which could lead to the foregoing advantages of a bearing element according to the present invention.

If the base portion 42 is too narrow, the mentioned leverage would be greatly and objectionably diminished. The flexibility of a lip portion such as base portion 42 depends largely upon the relationship of its width to its thickness; the flexibility increasing with relative increase in the width and decreasing with relative decrease in the width. The width of the portion 42 and, particularly of the latter's cylindrical surface 44, is illustrated as approximately twice the thickness of the portion 42, thus imparting a relatively high degree of flexibility in said portion, and providing for the mentioned leverage to be quite substantal.

The relationship of the just mentioned dimensions of base portion 42, as herein illustrated and described, is considered to be the preferred relationship. However, the advantages of including a portion such as base portion 42 in a sealing lip, may be derived in substantial measure, even if the width of said portion's cylindrical surface 44 is no greater than the thickness of said base portion.

The optional extremity portion 50 (see FIG. 2) constitutes a distinct part of the lip 36 only in that its inner, axially extending surface 52 (comparable to a surface formed by wear during operation), is molded in or machined to cylindrical condition rather than as an unvaried continuation of frusto-conical surface 48 of portion 46. The presence of the extremity portion 50, lengthens the lip 36 and thereby enhances its flexibility. Also, the surface 52 serves to minimize flexing of the lip 36 upon mounting of the bearing element upon a rod as such flexing terminates when the shoulder 56 reaches broken line z rather than continuing to end surface 54. The avoidance of unnecessary flexing is important in utilizing hard plastic material.

Additionally, if the frusto-conical surface 48 were continued, without variation to the end of the lip 36, the reaction at the end of the lip to the latter's dilation would be greater during initial reciprocating operation of the rod than if the cylindrical surface 52 is provided. Thus, the provision of the surface 52 minimizes power loss during such initial operation.

When the bearing element 24 is in operating position upon the rod 10, all inner, axially extending surfaces of the lip 36, as well as the inner surface of the body portion 34, are continuously cylindrical and in intimate sliding relation to the rod 10, as shown in FIG. 3. As the lip 36 is dilated, as already explained, in mounting of the bearing element upon the rod, and as said lip is resilient, the reaction to such dilation causes the lip to engage the rod firmly during operation and to continue such firm engagement even after wear of the inner surface of body portion 34 occurs from reciprocation of the rod. If the lip is provided with an extremity portion 50, that portion undergoes greater dilation than any other part of the bearing element with a correspondingly greater reaction. Consequently, this greater reaction strongly opposes departure of the surface 52 from its cylindrical condition.

Thus, irrespective of the presence or absence of an extremity portion 50, the inner sharp edge of end surface 54, or of a similar end surface provided at the outer end of the flaring portion 46, forcefully engages the reciprocating rod 10, thereby exerting a scraping action upon the rod to prevent dirt or other deleterious matter thereon from finding its way to the inner surface of body portion 34 whereby to minimize wear of the latter surface.

It will be understood that, in the use of the bearing element 24 as in FIG. 1, the lip 36 is relied upon chiefly for the just stated scraping purpose. Although said lip, in that illustrated arrangement, would be effective to some extent to seal against leakage of fluid from the cylinder 16, it is not relied upon for that purpose, but the packing rings 32 are relied upon as sealing means preventing or opposing such leakage.

In all the further embodiments now to be described, lips 36, as already detailed, are employed; and said further embodiments illustrate the use of such lips for fluid sealing purposes and, in some cases, for scraping purposes.

Figure 4:
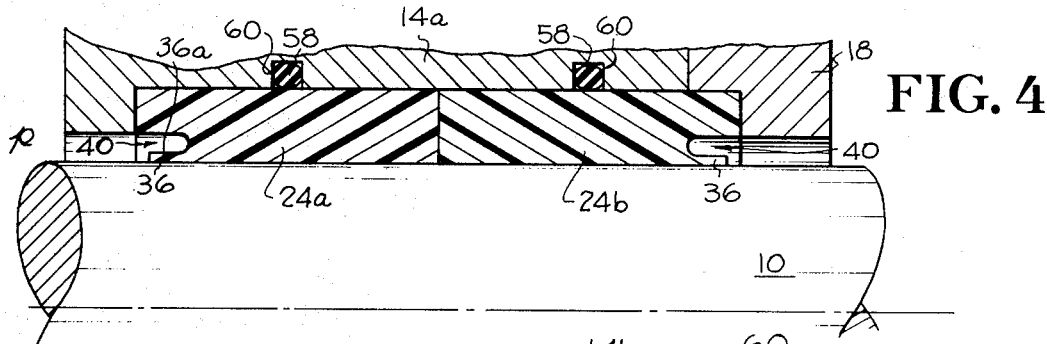
FIG. 4 is an enlarged, fragmentary, central longitudinal, sectional, half view of a back-to-back arrangement of bearing elements according to a second embodiment of this invention as applied to a relatively movable rod or shaft.

In the arrangement illustrated in FIG. 4, two similar bearing elements 24a and 24b are disposed back-to-back with their lips 36 directed away from each other. The lip of element 24a is directed toward pressure indicated at p, and the outer surface 36a of said lip is receptive of such pressure in the groove 40 so that said lip, in addition to the reaction to its dilation, is directly urged radially inwardly by such pressure to enhance the engagement of the lip with the rod as a fluid pressure seal. Thus, in this arrangement bearing element 24a takes the place of adapter 28 of FIG. 1.

The lip 36 of bearing element 24a performs the sliding sealing function of the packing rings 32 with respect to the rod 10, and rubber O rings 58, radially compressed in inner, annular grooves 60 in bearing housing 14a, perform the static sealing function of the packing rings 32 between the housing and the two bearing elements.

Lip 36 of bearing element 24b performs the scraping function already described. The presence or absence, in bearing elements 24a, 24b of grooves such as are shown at 26 in FIG. 1, is immaterial in the FIG. 4 arrangement.

Figure 5:
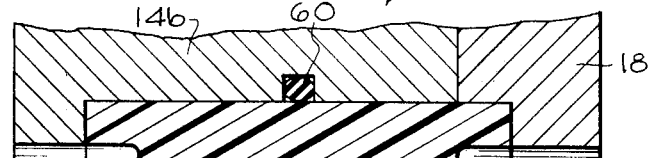
FIG. 5 is an enlaraged fragmentary, central longitudinal sectional view of a dual lipped bearing according to a third embodiment of this invention as applied to a relatively movable rod or shaft.

The arrangement of FIG. 5 is identical, in function, to the FIG. 4 arrangement. Structurally, however, only a single element, numbered 24c is employed to provide for both sealing and scraping with respect to the rod 10; and only a single static-seal O ring 60 is employed in bearing housing 14b. It may be seen that the length of the dual-lipped element 24c may be less than the combined lengths of elements 24a and 24b of FIG. 4, while still affording adequate bearing surface for supporting the rod 10.

Figure 6:
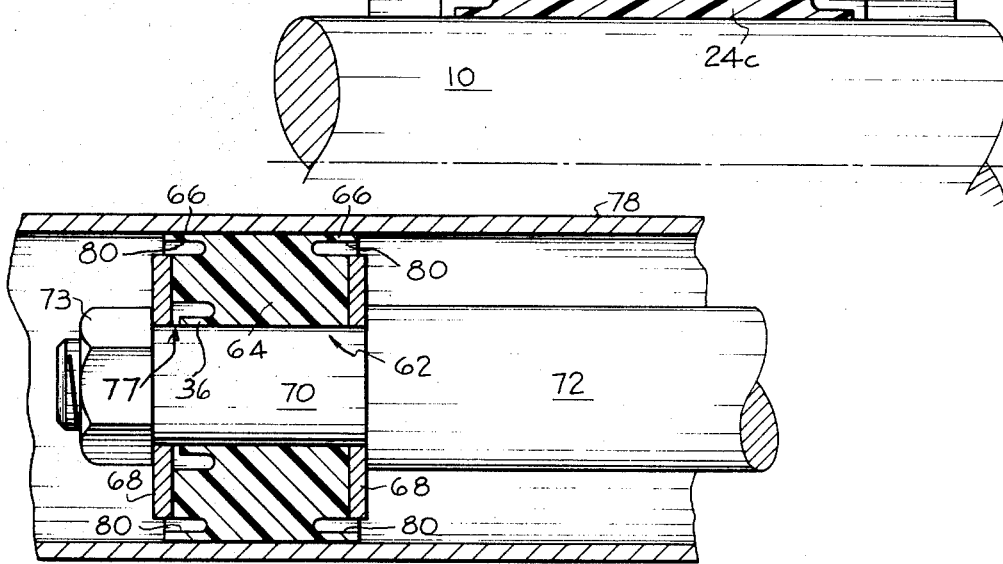
FIG. 6 is a central longitudinal sectional view of a bearing element according to a fourth embodiment of this invention as applied to a piston.

As shown in FIG. 6, an annular bearing element 62, having the already stated characteristics of elements 24a, 24b and 24c may constitute a main part of a piston or an entire piston. As illustrated, the element 62 has a massive, annular body portion 64 formed with sealing lips 66 at opposite ends of the body portion's outer periphery, and, optionally, includes a sealing lip 36 at one end of the body portion's inner periphery.

The body portion 64, sandwiched between metal washers or discs 68, is firmly clamped upon a reduced neck portion 70, at the inner end of a piston rod 72, by a nut 73 threaded upon the end of said neck portion.

Figure 7:
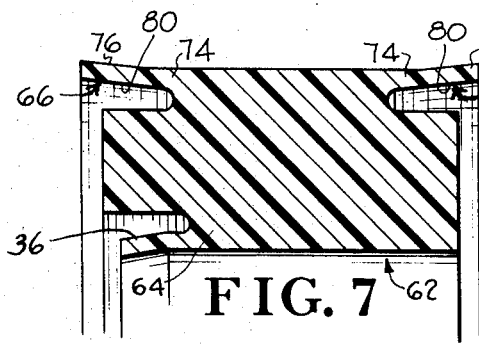
FIG. 7 is an enlargement of the portion of the bearing element appearing in the upper half of FIG. 6; sealing and scraping lips thereof being shown, however, in relaxed condition as before installation of the piston on a related piston rod and in a related cylinder.

The lips 66, instead of flaring inwardly in relaxed condition as with lips 36, flare outwardly as illustrated in FIG. 7. The lips 66 have cylindrical base portions 74 and flaring portions 76 which differ from portions 42, 46, respectively, of lips 36 only in being disposed and formed radially oppositely to the disposition and form of The lip 36 of FIGS. 6 and 7 is generally similar to lips 36 hereinbefore described, but is so related to body portion 64 that its end is spaced, as at 77, from the adjacent washer 68. Because of such spacing, any fluid pressure in cylinder 78, at the left or inner end of the piston and not effectively contained by said adjacent washer 68 will find its way through space 77 to impose its force upon the radially outer face of the lip 36 to augment the dilation reaction of the latter lip to hold said lip tightly against the neck portion 70 of the piston rod. Thus, the lip 36, in FIGS. 6 and 7, functions as a static seal between the bearing element 62 and the neck 70 of the piston rod.

As illustrated in FIG. 6, the piston may be considered as a single acting piston, the left or innermost lip 66 and the lip 36 both being sealing lips to prevent leakage of fluid rightwardly past the piston, while the right or outermost lip 66 functions chiefly as a scraping lip to prevent deleterious matter, which might find its way into the right portion of cylinder 78, from finding its way to the outer cylindrical surface of the bearing element 62.

However, if a piston of the general character illustrated in FIG. 6, is to be used as a double acting piston, responsive to pressures alternately predominating at opposite sides of the piston, the bearing element 62 may advantageously be provided with a second lip 36, located at the other end of element 62 at the latter's inner periphery and facing oppositely to the lip 36 which is illustrated in said figure. Such a second lip 36 should preferably be related to neck 70 of the piston rod and to the adjacent washer 68 similarly to the relationship of the illustrated lip 36 with its adjacent related parts.

Also, element 62, instead of functioning with respect to an inner member such as a rod, functions by supporting the piston within a cylinder 78 and by sliding engagement of its lips 66, with the inner surface of said cylinder. The lips 66 also have pressure receptive surfaces 80, responsive to fluid pressure in the cylinder 78 at one or both opposite sides of the element 62 to enhance the sliding engagement of said lips with the inner wall surface of said cylinder.

Figure 8:
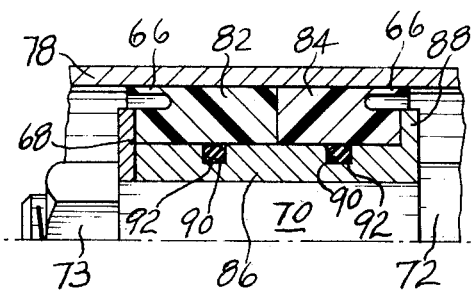
FIG. 8 is a central, longitudinal sectional, half view of a back-to-back arrangement of bearing elements according to a fifth embodiment of this invention as applied to a piston.

FIG. 8 illustrates a piston bearing arrangement somewhat similar to the rod bearing arrangement shown in FIG. 4, lips 66, however, being disposed at the outer ends of outer peripheries of bearing elements 82 and 84 so that said lips effect sliding, sealing and/or scraping engagement with the inside surface of a cylinder 78.

The bearing elements 82, 84 are carried upon a metal mounting sleeve 86, and are axially compressed between an integral flange 88 at one end of said sleeve and a metal washer 68 disposed at the sleeve's opposite end. The sleeve 86 should fit fluid-tightly upon reduced portion 70 of piston rod 72 and is firmly clamped thereon by nut 73. Static, fluid sealing, between the rod portion 70 and the bearing elements 82, 84, is provided by rubber O rings 90, compressed radially within annular grooves 92 formed in the sleeve 86.

While the foregoing description speaks of the bearing element 24 as being mounted upon rod 10 by sliding said element leftwardly, it could be readily mounted by providing, at the left end of the rod, a chamfer (not shown) corresponding generally but oppositely to the shoulder 56, under which arrangement the bearing element could be slid rightwardly upon the rod, easily and without damage to the bearing element's lips. It should be realized, also, that the pistons shown in FIGS. 6 and 8 may be introduced into a cylinder 78, easily and without damage, by providing an inside chamfer (not shown) at the end of said cylinder into which the piston is to be inserted.

It should be understood that this disclosure is only illustrative and that this invention may be practiced in other ways without departing from its characteristics as set forth in the following claims.

We claim:

1. A one piece bearing element of relatively stiff plastic material comprising an annular body portion having inner and outer surfaces one of which is cylindrical and is adapted for intimate sliding engagement with a cylindrical surface of a related machine element, and a coaxial, annular lip, integral with and extending axially outwardly from one end of said body portion; said lip having a resilient annular base portion, constituted entirely of said plastic material, adjoining and protruding axially to a substantial extent from said body portion, and having a cylindrical slide surface of substantial width continuing axially outwardly from said one surface of the body portion, and a resilient flaring portion adjoining said base portion and having, in the relaxed condition of said lip, a frusto-conical slide surface adjoining and continuing axially outwardly from said cylindrical slide surface of the base portion; said lip being sufficiently resilient to enable it to be so flexed as to bring said slide surfaces of the base and flaring portions into cylindrical continuity with said one cylindrical surface of said body portion; and the width of said base portion being at least as great as the lip's thickness at the juncture of said slide surfaces of the base and flaring portions, the distortion arising within the plastic material of the bearing element from such flexing being thereby confined to said base and flaring portions and excluded from said body portion.

References Cited

UNITED STATES PATENTS

| 3,330,605 | 7/1967 | Jasmand | 308—3.5 |
| 1,945,293 | 1/1934 | Pierce | 277—205 X |
| 2,881,032 | 4/1959 | Connolly | 308—36.1 |
| 3,179,427 | 4/1965 | Rizzo | 277—206 X |
| 3,366,425 | 1/1968 | Genz | 308—3.5 |

FOREIGN PATENTS 1,196,448  11/1959  France.

MARTIN P. SCHWADRON, Primary Examiner

L. L. JOHNSON, Assistant Examiner

U.S. Cl. X.R.

308—36.1; 277—205, 206

UNITED STATES PATENT OFFICE
CERTIFICATE OF CORRECTION

Patent No. 3,527,507 September 8, 1970

Norman E. Clark et al.

It is certified that error appears in the above identified patent and that said Letters Patent are hereby corrected as shown below:

Column 4, line 53, cancel "shoulder with said flaring portion would occur at line". Column 6, line 34, after "of" insert -- lips 36. --.

Signed and sealed this 23rd day of March 1971.

(SEAL)
Attest:

Edward M. Fletcher, Jr.
Attesting Officer

WILLIAM E. SCHUYLER, JR.
Commissioner of Patents